United States Patent
Hersent

(10) Patent No.: US 11,233,771 B2
(45) Date of Patent: Jan. 25, 2022

(54) COMMUNICATION INTERFACE FOR A LOW POWER WIDE AREA NETWORK, WIRELESS DEVICE AND SERVER USING SUCH COMMUNICATION INTERFACE

(71) Applicant: ACTILITY, Lannion (FR)

(72) Inventor: Olivier Hersent, Bougival (FR)

(73) Assignee: ACTILTY, Lannion (FR)

( * ) Notice: Subject to any disclaimer, the term of this patent is extended or adjusted under 35 U.S.C. 154(b) by 167 days.

(21) Appl. No.: 16/481,383

(22) PCT Filed: Mar. 2, 2017

(86) PCT No.: PCT/IB2017/000924
§ 371 (c)(1),
(2) Date: Jul. 26, 2019

(87) PCT Pub. No.: WO2018/158607
PCT Pub. Date: Sep. 7, 2018

(65) Prior Publication Data
US 2019/0394172 A1  Dec. 26, 2019

(51) Int. Cl.
*H04L 29/06* (2006.01)
*H04L 9/08* (2006.01)
(Continued)

(52) U.S. Cl.
CPC ........ *H04L 63/0428* (2013.01); *H04L 9/0861* (2013.01); *H04L 9/0891* (2013.01);
(Continued)

(58) Field of Classification Search
CPC . H04L 63/0428; H04L 9/0891; H04L 63/062; H04L 63/08; H04L 9/3242;
(Continued)

(56) References Cited

U.S. PATENT DOCUMENTS 6,684,331 B1 * 1/2004 Srivastava ............ H04L 9/0836
713/163
2016/0036826 A1 2/2016 Pogorelik et al.
(Continued)

OTHER PUBLICATIONS

St: « STSAFE-A1X Authentication, data integrity and confidentiality for Sigfox Ready (TM) IoT devices Contents Feb. 20, 2017 (Feb. 20, 2017) XP055406417.
(Continued)

*Primary Examiner* — Bejamin A Kaplan
(74) *Attorney, Agent, or Firm* — Dentons US LLP

(57) ABSTRACT

The present invention relates to a communication interface (200) for supporting communication between a wireless device (101, 102, 103) and a server (121) over a low power wide area network, LPWAN, comprising: an untrusted execution part (201) configured to operate in accordance with an LPWAN communication protocol stack (203) including at least one secured LPWAN protocol using cryptographic primitives; a memory (205) for storing computer code (206) and at least one cryptographic key (207, 208, 209) in an encrypted form; a trusted execution part (202) incorporating a root secret (210) for decrypting the at least one cryptographic key (207, 208, 209) from the memory (205), wherein the trusted execution part (202) is configured to execute the cryptographic primitives of the at least one secured LPWAN protocol using the decrypted cryptographic key and computer code (206) from the memory (205).

30 Claims, 4 Drawing Sheets

(51) Int. Cl.
*H04L 9/32* (2006.01)
*H04W 12/041* (2021.01)
*H04W 12/0433* (2021.01)

(52) U.S. Cl.
CPC .......... *H04L 9/3242* (2013.01); *H04L 63/062* (2013.01); *H04L 63/08* (2013.01); *H04W 12/041* (2021.01); *H04W 12/0433* (2021.01)

(58) Field of Classification Search
CPC ........ H04L 9/0861; H04L 67/12; H04W 4/70; H04W 12/0433; H04W 12/041; H03M 12/1102; Y02D 30/70
See application file for complete search history.

(56) References Cited

U.S. PATENT DOCUMENTS

| | | | | |
|---|---|---|---|---|
| 2016/0044007 A1* | 2/2016 | Boudguiga | ............. | H04L 9/083 713/171 |
| 2017/0180122 A1* | 6/2017 | Smith | ................... | H04L 9/0833 |
| 2017/0366342 A1* | 12/2017 | Gehrmann | .......... | H04W 12/041 |
| 2018/0019976 A1* | 1/2018 | Ben-Shalom | ......... | H04L 12/185 |

OTHER PUBLICATIONS

Murata; LaRa Module Data Sheet Sample Part No. CMWXZZABZ-TEMP CMWXZZABZ-TEMP-TEMP-1 MP Part No. CMWXZZABZ-078 CMWX77ABZ-091 Jan. 19, 2017 (Jan. 19, 2017) XP055406416.
Lora Alliance : "LoRaWan Security—Frequently Asked Questions", Jul. 1, 2016 (Jul. 1, 2016), XP055406408.
LoRaWAN specification V1.0.

\* cited by examiner

COMMUNICATION INTERFACE FOR A LOW POWER WIDE AREA NETWORK, WIRELESS DEVICE AND SERVER USING SUCH COMMUNICATION INTERFACE

This application is a National Stage Entry of International Application No. PCT/IB2017/000924, filed Mar. 2, 2017, which is hereby incorporated by reference in its entirety for all purposes as if fully set forth herein.

The present invention relates to wireless communication, and more specifically to secure communication between a wireless device and a server over a Low Power Wide Area Network (LPWAN).

BACKGROUND OF THE INVENTION

Low Power Wide Area Networks (LPWANs) are low-power wireless networks which allow long range communications at a low bit rate. These networks are particularly suitable for Machine-To-Machine (M2M) and Internet of Things (IoT) applications, which are limited in terms of memory capacity, computing power and energy. Sigfox, LTE-NB1 ("Long Term Evolution—Machine to Machine, Narrow Band") or LoRaWAN ("Long Range Radio Wide Area Network") are examples of such networks.

FIG. 1 describes the architecture of an LPWAN which, by way of illustration, may be of the LoRaWAN type. A LoRaWAN network follows a star topology, in which messages between devices, called end-devices, 101, 102, 103 and a central network server 121 are transmitted and received through gateways 111, 112. The end-devices 101, 102, 103 and the gateways 111, 112 communicate according the low bit rate LoRa radio technology, while the gateways and the network server 121 usually communicate using higher bit rate backhauling technologies, such as Ethernet or 4G for example. The network server then communicates with a plurality of application servers 131, 132 from which the application providers exploit data from the end-devices 101, 102, 103, and may instruct the network server to send downlink packets to the end-devices.

For some applications, for example in industrial IoT and commercial applications, a huge number of connected devices equipped with sensors have to be deployed: there could potentially be tens of billions of communicating sensors to connect to networks in the coming years. These sensors operate on batteries and daily transmit very small amounts of data at a low bit rate to servers. LPWANs are thus a good solution for these applications, which do not need a high bit rate, and for these devices with limited resources, for which an autonomy of several years is needed.

In LPWAN, IoT communication between a device (also designated here by "end-device") and its data processing platform typically takes place over a Radio Frequency (RF) interface, open to eavesdropping. This communication needs to be secured to ensure confidentiality as well as integrity of the data from and to the device.

The current state of the art in IoT secure communications relies on a (or several) shared secret(s) that is (are) used, directly or by means of key derivation techniques, to encrypt and/or authenticate communications between an end-device and a network server.

In some advanced implementations, the shared secrets are used over the air and computed from a cryptographic key, hereinafter referred to as "application key", known by both of the end-device and the network server, which is never communicated over the air.

For example, in the LoRaWAN standard, activating an end-device on the network can be done by the "Over-The-Air Activation" (OTAA) method. To achieve OTAA, the end-device sends a message and a cryptogram computed with its application key (AppKey). The server checks if the end-device is authorized to join the network, on the basis of this AppKey, which has been communicated beforehand to the server (during the device commissioning process). If the end-device is authorized, the server sends a downlink message including some cryptographic data. Then, two session keys (one for network related functions such as integrity protection, the other for user payload encryption) are derived at the end-device, based on the received data.

The limitation of the current security architecture is linked to the possibility of physical attacks to the end-device or to the server. Some high security applications may rely on information generated by an IoT sensor, and the possibility to spoof data triggers from a legitimate sensor may lead to important consequences. If a server is accessed by an attacker, the application keys of potentially millions of devices are exposed.

If the sensor can be physically accessed by an attacker, the attacker will be able to physically access the device flash and RAM memory, and therefore access the application key that is used to bootstrap the communication security. An implementer may choose to encrypt this secret, but such encryption will rely on code, or additional secrets that are also present in memory, and the attacker therefore always has enough information to reverse the obfuscation strategy and reach the bootstrap secret.

The limitations highlighted in the previous sections relate to the physical accessibility of the memory used to store the application key. In the last 20 years, technologies have been developed to provide physical protection to an application key, inside a module that implements multiple strategies to make it "impossible" to retrieve a secret key. "Impossible" is to be understood in the sense of "not achievable with means that are proportional to the potential profit that may be obtained by accessing the secret key".

Such security modules have to implement standard cryptographic methods that rely on the secret key, such as RSA public key and private key operations. The physical module implementing physically protected secret and cryptographic code and providing a secure Application Programming Interface (API) to an external processor is called a "Secure Element" (SE).

However, the utilization of Secure Elements in the context of IoT security has many drawbacks. For instance:
- they represent a significant cost, which, related to the cost of RF and microcontroller subsystem typically used in an IoT device, may add 50% or more to the cost of the device;
- they use additional energy, in a context where devices are sometimes optimized for battery life of 10 years or more;
- they use additional printed circuit board space, whereas compactness is important;
- conventionally, they can only operate specific standard cryptographic primitives, defined during the design stage. As a result "non standard" operations or intermediate computations based on secret information still need to be implemented in a non-secure space, and thus may expose the secret information over the communication bus and RAM;
- they typically implement only the standard mainstream cryptographic primitives which are adapted for the computer or secure storage world, but do not take into account the extreme limitations of an IoT communication link: LPWAN technologies, such as LoRaWAN for example, are limited to 50 bytes per uplink or so in the downlink, and accept only very few uplink or downlink messages per day. Certificate-based cryptography, or hash methods, are therefore not usable in their standard form. Therefore, dedicated SEs for each IoT technology would need to be developed, making it impossible to design multiprotocol devices and adding to the cost of design;

they do not allow upgrades without significantly adding to the overall SE cost. Upgradability is important in the IoT context, where millions of devices may be deployed over the next few decades, and stay operational for over 10 years. End devise must be adaptable to the advances in security technology in this time frame.

There is thus a need for alternative solutions to ensure the security of LPWAN IoT communication.

SUMMARY OF THE INVENTION

The invention relates to a communication interface for supporting communication between a wireless device and a server over an LPWAN. The communication interface comprises:
- an untrusted execution part configured to operate in accordance with an LPWAN communication protocol stack including at least one secured LPWAN protocol using cryptographic primitives;
- a memory for storing computer code and at least one cryptographic key in an encrypted form;
- a trusted execution part incorporating a root secret for decrypting the at least one cryptographic key from the memory, wherein the trusted execution part is configured to execute the cryptographic primitives of the at least one secured LPWAN protocol using the decrypted cryptographic key and computer code from the memory.

This communication interface can be used in a device or a server (network server or application server).

The trusted execution part can implement all the operations that have to be secured (encryption, decryption, execution of cryptographic primitives . . . ) while the untrusted execution part can communicate with a device or server via an unsecured link. For instance, the trusted execution part encrypts a message and the untrusted execution part sends the encrypted message via a standard (unsecure) communication link.

Advantageously, the communication interface comprises a microcontroller chip which includes both the untrusted execution part and the trusted execution part Hence, a single semiconductor chip can carry out all security and communication functions, which is particularly desirable in the case of end-devices which are potentially very numerous and therefore must have a low hardware cost.

In one embodiment, the memory has a reprogrammable memory section for storing computer code and a cryptographic application key in an encrypted form, and a RAM or flash section for storing, in an encrypted form, at least one cryptographic session key computed by the trusted execution part as a function of the cryptographic application key.

The use of a reprogrammable memory section advantageously makes it possible to update/upgrade an application key or a portion of the code stored in the memory. Hence, the communication interface of the present invention ensures the security of LPWAN IoT communication while ensuring lower costs and better evolutivity. For instance, the engineer/administrator in charge of the manufacture of a connected object may change the application key of a device both in the server and in the device. This administrator also can change a code portion in the communication interface of the server, so that this change can then be sent to a multicast group of devices.

To implement this multicast transmission, the reprogrammable memory section can be further provided for storing a cryptographic group key written in an encrypted form by the trusted execution part in response to a command for joining a multicast group of wireless devices.

In the context of an LPWAN including communication protocols based on application and session keys (such as LoRaWAN for instance), the execution of one of the cryptographic primitives by the trusted execution part can comprise encrypting concatenated information elements of a first set of information elements with an application key decrypted from the memory to derive a first session key, wherein the first set of information elements includes at least one nonce.

More specifically, the concatenated information elements of the first set may include a first nonce generated by the server, an identifier of the LPWAN and a second nonce generated by the wireless device.

In this context, the trusted execution part can be configured to compute the key derivation material sent over the air during the key derivation handshake, and then encrypt the first session key with the root secret and write the encrypted first session key in a RAM or flash section of the memory.

The execution of one of the cryptographic primitives by the trusted execution part can comprise encrypting a message provided by the untrusted execution part using the first session key. The encryption procedure is specific to the LPWAN protocol, typically not available in a standard Secure Element: it is executed by the secure part of the communication interface from encrypted code implementing the specific encryption procedure, said encrypted code being integrity checked and decrypted using the secure subsystem root secret.

The execution of one of the cryptographic primitives by the trusted execution part also can comprise encrypting concatenated information elements of a second set of information elements with the application key decrypted from the memory to derive a second session key, wherein the second set of information elements includes at least one nonce.

The concatenated information elements of this second set can include a first nonce generated by the wireless device, an identifier of the LPWAN and a second nonce generated by the server.

The trusted execution part may be configured to encrypt the second session key with the root secret and write the encrypted second session key in a RAM or flash section of the memory.

When a second session key is derived, the execution of one of the cryptographic primitives by the trusted execution part may comprise computing a Message Integrity Check (MIC) value based on an encrypted message using the second session key. The MIC can be further computed based on concatenated elements, including an address of the wireless device.

This MIC value may be included in a payload for an uplink or downlink message sent via the LPWAN.

A MIC value may also be computed:
- based on concatenated elements, including a nonce generated by the wireless device, an identifier of the device, and an identifier of an application provider, using an application key decrypted from the memory; and/or based on concatenated elements, including an identifier of the LPWAN and an address of the wireless device, using an application key decrypted from the memory.

Such MIC values may be included in a payload for a "join request" message (from the end-device to the network server) and for a "join accept" message (from the network server to the end-device), respectively, in the case of an OTAA in the LPWAN.

Another aspect of the invention relates to a wireless device having a communication interface as described above for communicating with a server over an LPWAN.

The trusted execution part of the communication interface of the device can be configured to change at least one cryptographic key stored in an encrypted form in the memory of the communication interface in response to a key update command received over the LPWAN. The change of the cryptographic key can be performed by the trusted execution part using an update key stored in an encrypted form.

Thus, if one cryptographic key has been compromised, it can be changed easily and in a secure way.

The trusted execution part of the communication interface can be configured to change a portion of the computer code stored in the memory in response to a code upgrade command received over the LPWAN. The code upgrade command can be received on a multicast address of the LPWAN in at least one encrypted message which is decrypted by the trusted execution part using a cryptographic group key stored in an encrypted form in the memory.

Hence, it is possible to securely and easily upgrade a code stored in memory (for instance, bootstrapping cryptographic primitives, or multicast group short term key derivation algorithms) of all the devices of a group.

In this context of code upgrade, the communication interface can be configured to apply redundancy decoding to the at least one encrypted message to obtain an upgraded code portion for changing the portion of the computer code stored in the memory.

When an upgrade message is sent from a server to a device, packet loss may happen. Adding redundancy in the transmitted information (by applying redundancy encoding/decoding at the server/device side, respectively) allows the device to compensate a loss of information.

For instance, the redundancy decoding can comprise a low-density parity check (LDPC) decoding.

Furthermore, the trusted execution part can be configured to compute a hash code based on a cryptographic key stored in an encrypted form in the memory and an upgraded code portion received as part of the code upgrade command, and the communication interface can be configured to transmit the hash code to a verification server and to receive a response from the verification server to validate whether the portion of the computer code is to be changed.

This advantageously enables to check the authenticity of the received message in the context of a code upgrade.

Yet another aspect of the invention relates to a server having a communication interface as described above for communicating with a plurality of wireless devices over an LPWAN.

The memory of the communication interface may store a plurality of cryptographic application keys in an encrypted form, each cryptographic application key being for a respective wireless device of the LPWAN.

For changing the cryptographic application key for one of the plurality of wireless devices, the communication interface can be configured to transmit a key update command to the one of the wireless devices over the LPWAN, through a unicast address of the one of the plurality of wireless devices, and the trusted execution part of the communication interface can be configured to change the cryptographic key stored in an encrypted form in the memory of the communication interface for the one of the plurality of wireless devices.

For changing a computer code portion used by a group of wireless devices, the communication interface can be configured to transmit a code upgrade command over the LPWAN, through a multicast address of the LPWAN. The trusted execution part of the communication interface can be configured to encrypt the code upgrade command with a cryptographic group key associated with the multicast address of the LPWAN prior to transmission through the multicast address.

As mentioned above, the encrypted code upgrade command can be redundancy encoded and then split into a plurality of fragments transmitted in respective messages to the multicast address of the LPWAN. In a particular embodiment, the encrypted code upgrade command can be redundancy encoded using LDPC encoding.

Finally, an authenticity check of the message can be performed as follows:

the communication interface receives a first hash code from one of the group of wireless devices, the trusted execution part computes a second hash code based on a cryptographic key stored in an encrypted form in the memory for the one of the group of wireless devices and an upgraded code portion to be substituted for the computer code portion used by the group of wireless devices, the communication interface compares the first and second hash codes and to send a response to the one of the group of wireless devices depending on whether or not the first and second hash codes are identical.

Other features and advantages of the method and apparatus disclosed herein will become apparent from the following description of non-limiting embodiments, with reference to the appended drawings.

BRIEF DESCRIPTION OF THE DRAWINGS

The present invention is illustrated by way of example, and not by way of limitation, in the figures of the accompanying drawings, in which like reference numerals refer to similar elements and in which.

DESCRIPTION OF EMBODIMENTS

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

A person skilled in the art will readily appreciate that various parameters disclosed in the description may be modified and that various embodiments disclosed may be combined without departing from the scope of the invention.

Figure 2:
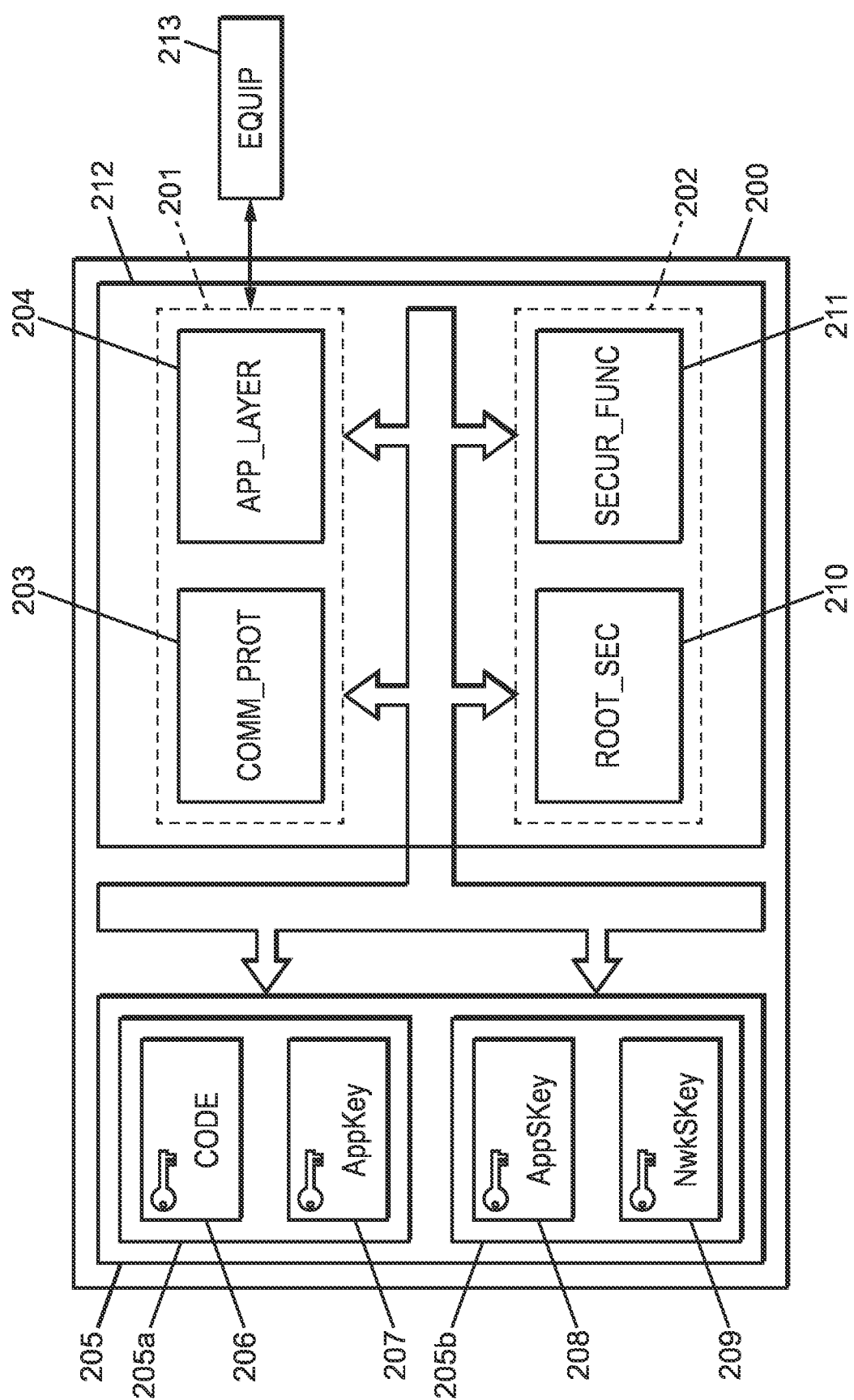
FIG. 2 is a block diagram of a communication interface, in a possible embodiment of the present invention.

FIG. 2 is a block diagram of a communication interface in a possible embodiment of the present invention.

This communication interface 200 can be included in a device (or end-device) or in a server (network server or application server).

According to FIG. 2, the communication interface 200 contains at least an untrusted execution part 201, a trusted execution part 202 and a memory 205.

It is meant by "trusted execution part" a part of a processor or microprocessor which is secured, and which ensures that computer code and data run or loaded inside are protected in terms of confidentiality and integrity. On the other hand, "untrusted execution part" refers to a part of a processor which does not ensure this protection of computer code or data.

In a preferred embodiment, the trusted and untrusted execution parts are both included in a single microcontroller chip 212. By way of example and without limitation, the microcontroller may be a processor commercialized by the company ARM and equipped with "Trustzone®" security technology, which is programmed into the hardware. This type of processor can run a secure operating system and an unsecure (or "normal") operating system at the same time from a single core.

In the particular embodiment represented in FIG. 2, the untrusted execution part 201 manages the application layer 204, which contains functional applications where the device behavior and functionalities are implemented. It can also implement the drivers for managing the device peripheral units. It may furthermore implement the communication protocol libraries 203 for communicating with equipment 213 (which may be a server if the communication interface 200 is part of an end-device, or an end-device is the communication interface 200 is part of a server), according to an LPWAN communication protocol stack, such as LoRaWAN for example.

The trusted execution part can run LPWAN security functions 211, such as encryption, decryption or integrity verification functions. It also incorporates a root secret 210, which is a component-related secret, specific to the microprocessor and distinct from the "application key" used for bootstrapping a communication over the LPWAN. The root secret 210 enables to encrypt and decrypt information to be stored in or read from the memory in the microprocessor. It is embodied into the microprocessor during the factory manufacture, and made available by the manufacturer to the user/engineer/administrator in charge of deploying the end-devices, so that this user/engineer/administrator is able to write computer code into memory.

The memory 205 can store non-encrypted data (that is, data stored in a "normal", non-encrypted form) and encrypted data (that is, data stored in an encrypted form), including at least one cryptographic key AppKey in a memory area 207 and computer code in a memory area 206.

The memory can also store, in an encrypted form, cryptographic session keys AppSKey, NwkSKey, derived from algorithms included in computer code 206 which can be loaded and run in the trusted execution part 202.

Cryptographic key names such as AppKey, AppSKey or NwkSKey are mentioned here with reference to the LoRa protocols by way of illustration. It will be appreciated that other names may be in use in other types of LPWAN without changing the technical features discussed below.

More information on the illustrative example of LoRaWAN networks can be obtained from the "LoRa Specification", or "LoRaWAN Specification", Version V1.0, authored by N. Sornin, M. Luis, T. Eirich, T. Kramp and O. Hersent and released by LoRa Alliance, Inc., January 2015.

As shown in the exemplary embodiment of FIG. 2, the memory 205 includes a reprogrammable memory section 205a, and a RAM or flash section 205b.

The reprogrammable memory section 205a can store, for instance, the computer code in area 206 and the cryptographic key AppKey in area 207. These are semi-permanent pieces of information which an end-device must keep even it is idle. They may be updated, but mostly on a long-term basis. Thus, the reprogrammable memory section 205a may typically be made as a flash memory section. The engineer in charge of managing the end-devices can modify all or part of the code in memory area 206, as well as the AppKey in memory area 207. This enables to update cryptographic algorithms, which can be complex in the context of IoT networks as discussed further below, and to change the AppKey, for instance if it has been compromised.

On the other hand, the session keys stored in areas 208, 209 are changed every time a new communication session is established. They only need short time storage which may be achieved with a RAM section 205b. Alternatively, a flash memory section may also be used.

The AppKeys stored in memory area 207 are application keys used for bootstrapping a secure wireless communication protocol, and the computer code stored in memory area 206 includes cryptographic primitives of the communication protocol.

In the case of a communication interface in an end-device, the application key AppKey is a key specifically associated to the end-device. In the case of a communication interface in a network server, the memory stores a plurality of application keys, each application key being associated to an end-device belonging to the network. Due to the large amount of keys to be stored on the server's side, this plurality of application keys can be alternatively stored in an encrypted form on a hard drive physically separate from the other memory sections.

In this embodiment, for establishing a communication between a device including the communication interface 200 and equipment 213 according to a wireless communication protocol, a decryption function 211 is run for decrypting the AppKey by using the root secret 210. Then, cryptographic primitives are executed based on the decrypted application key, in order to derive, for instance, one or more cryptographic session keys such as the above-mentioned AppSKey and NwkSKey.

The following examples are developed in the case of LoRa communication protocols, but it has to be understood that the present invention is not limited to those, and can be used for any type of LPWAN including use of cryptographic primitives.

In the case of LoRa communication protocols:
the memory 205 of the communication interface 200 of the end-device contains the Device Identifier (DevEUI), the Application provider Identifier (AppEUI), and the encrypted Application Key (AppKey)—typically, the AppKey can be encrypted by Advanced Encryption Standard (AES)-128; and the memory 205 of the communication interface 200 of the network server contains the AppKeys of all the devices related to the server.

The Over-The-Air Activation (OTAA) method for an end-device to join the network consists in the following steps:

- the end-device sends to the network server a "join request" message containing the AppEUI and the DevEUI of the end-device followed by a nonce DevNonce picked by the end-device. A Message Integrity Code (MIC) is also transmitted to the server. For instance, the MIC is calculated as the four least significant octets of 'cmac' using the following cryptographic primitive:

$cmac=aes128\_cmac$(AppKey, MHDR|AppEUI|DevEUI|DevNonce), $MIC=cmac[0 \ldots 3]$, where MHDR designates the header of a medium access control (MAC) protocol layer used in the LPWAN in the "join request" message, and $x_1$ |$x_2$| ... |$x_n$ represents the concatenation operation applied to a number n of information elements $x_1$, $x_2$, ..., $x_n$.

Such cryptographic function is typical of the non-standard security functions required by the nature of LPWANs which are not available from a standard multipurpose Secure Element;

- the server checks the received MIC via the AppKey and determines whether the device is authorized;
- if the device is authorized by the server, the server sends a "join accept" message to the device. This join accept message contains a nonce AppNonce picked by the application layer et the network server, a network identifier (NetID), an end-device address (DevAddr), a delay between transmission and reception (RxDelay) and an optional list of channel frequencies (CFList) for the network the end-device is joining. The MIC value for the join accept message can be calculated as follows:

$cmac=aes128\_cmac$(AppKey, MHDR|AppNonce-|NetID|DevAddr|DLSettings|RxDelay|CFList)

$MIC=cmac[0 \ldots 3]$, where DLSettings is one byte of downlink configuration information of the MAC layer.

At the end-device 200, after receiving the join accept message, two session keys, AppSKey and NwkSKey, can be derived from cryptographic primitives run in the trusted execution part 202 of the communication interface of the end-device.

Figure 1:
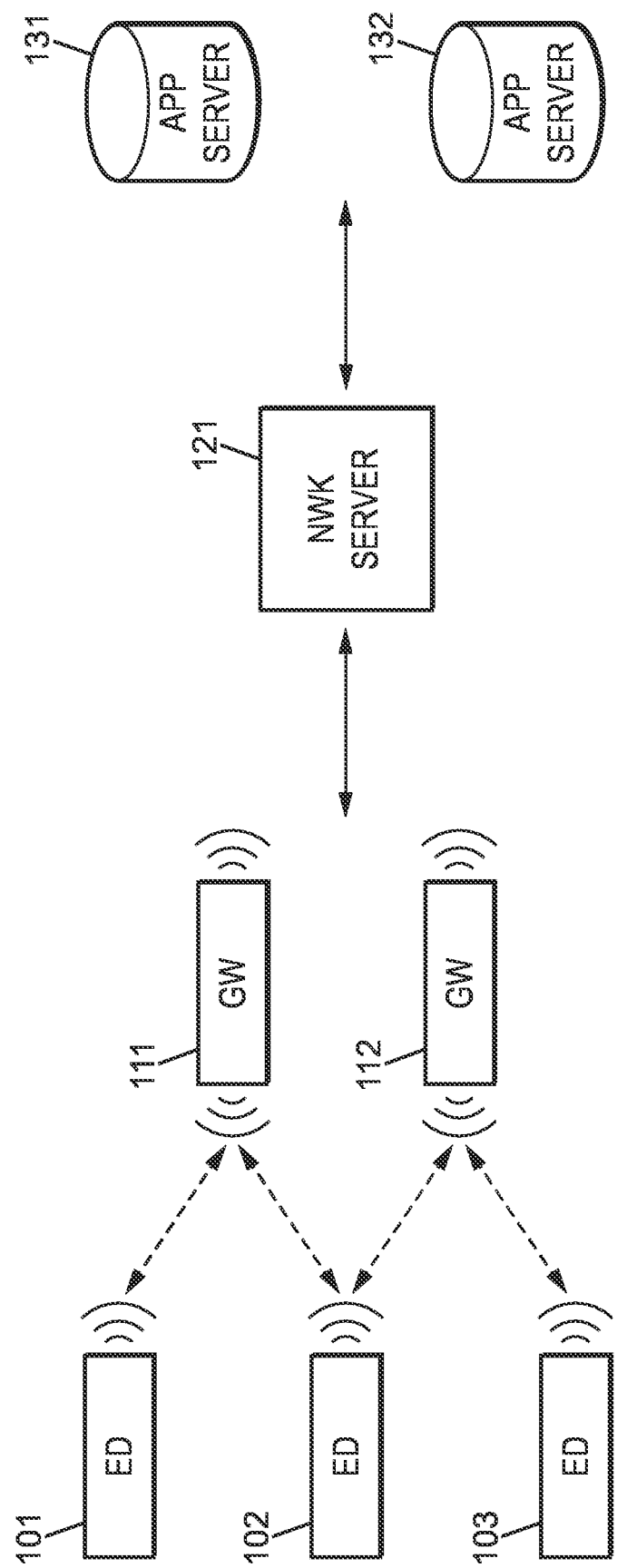
FIG. 1 is a representation of a LoRaWAN network architecture to which the invention may be applied.

These two session keys, which are specific for the end-device, are dynamically computed by both the device and the server, and renewed at each new session. They are necessary for subsequently transmitting data from the device to the server. More specifically, the NwkSKey, which may in some versions of the LoRaWAN standard be computed separately in the downlink and in the uplink direction, is used by both the network server (121 in FIG. 1) and the end-device to calculate and verify the MIC of all data messages to ensure data integrity. It is further used to encrypt and decrypt the payload field of a MAC-only data messages. The AppSKey is used by both the application server (131 or 132 in FIG. 1) and the end-device to encrypt and decrypt the payload field of application-specific data messages. It is also used to calculate and verify an application-level MIC that may be included in the payload of application-specific data messages.

In the case of an OTAA in an LPWAN LoRa communication protocol, the two session keys are derived as follows:

- after the reception of the join accept message from the network server, the end-device (101 in FIG. 1) is in possession of a number of information elements including the AppNonce (a random value or some form of unique ID provided by the network server), the DevNonce (generated by the end-device 101), and the network ID NetID;
- then, cryptographic primitives can be run in the trusted execution part (202 in FIG. 2) using the decrypted AppKey and concatenated information elements including AppNonce, DevNonce and NetId, in order to derive the AppSKey and the NwkSKey, which are encrypted with the root secret and stored in the encrypted form in the memory (205 in FIG. 2).

Typically, according to LoRaWAN specification 1.0, the session keys are derived as follows:

$NwkSKey=aes128\_encrypt$(AppKey, 0x01|AppNonce|NetID|DevNonce|$pad_{16}$)

$AppSKey=aes128\_encrypt$(AppKey, 0x02|AppNonce|NetID|DevNonce|$pad_{16}$)

Other versions of the LoRaWAN specification compute several Network session keys, e.g. in the uplink and downlink direction, and for visited networks in a roaming situation. Also the MIC code may be split in two parts for home and visited network verification. These changes can all be implemented as straightforward evolutions of the embodiment illustrated for version 1.0 of LoRaWAN.

With the communication interface of the present invention, the derivation of NwkSKey, AppSKey and MIC consists of a succession of operations running entirely in a secure space, by using the LPWAN cryptographic primitives as an Application Programming Interface (API) between the microcontroller untrusted execution part (which may run standard application code and most of the LPWAN protocol stack), and the trusted execution part. Thus, the LPWAN cryptographic algorithms that are required to expose cryptographic material to the non-secure environment running the protocol stack are implemented in the trusted execution part. They reside encrypted in memory, and are available to the trusted part only at execution time, inaccessible from any attacker.

Once the end-device is activated on the network, data messages can be exchanged between the end-device and the server. In LoRa communication protocols, a message (in uplink or downlink) carries a PHY payload including a MAC header (MHDR), a MAC payload, and a message integrity code (MIC). The MAC payload contains a frame header (FHDR), an optional port field (FPort) and an optional frame payload field (FRMPayload). The message can thus be written: msg=MHDR|FHDR|FPort|FRMPayload.

If a data frame carries payload, FRMPayload must be encrypted before the message integrity code (MIC) is calculated. The encryption is based on a cryptographic key which is the NwkSKey or the AppSKey, depending on the value of the FPort of the data message. More specifically, the NwkSKey is used if FPort=0, and the AppSKey is used if FPort=1 . . . 255.

Finally, the MIC value can be calculated over all the fields in the message from an encrypted message using the NwkSKey as follows:

$$cmac = aes128\_cmac(NwkSKey, B_0|msg)$$

$$MIC = cmac[0 \ldots 3]$$

where $B_0$ is a block including, in particular, the device address (DevAddr).

Figure 3:
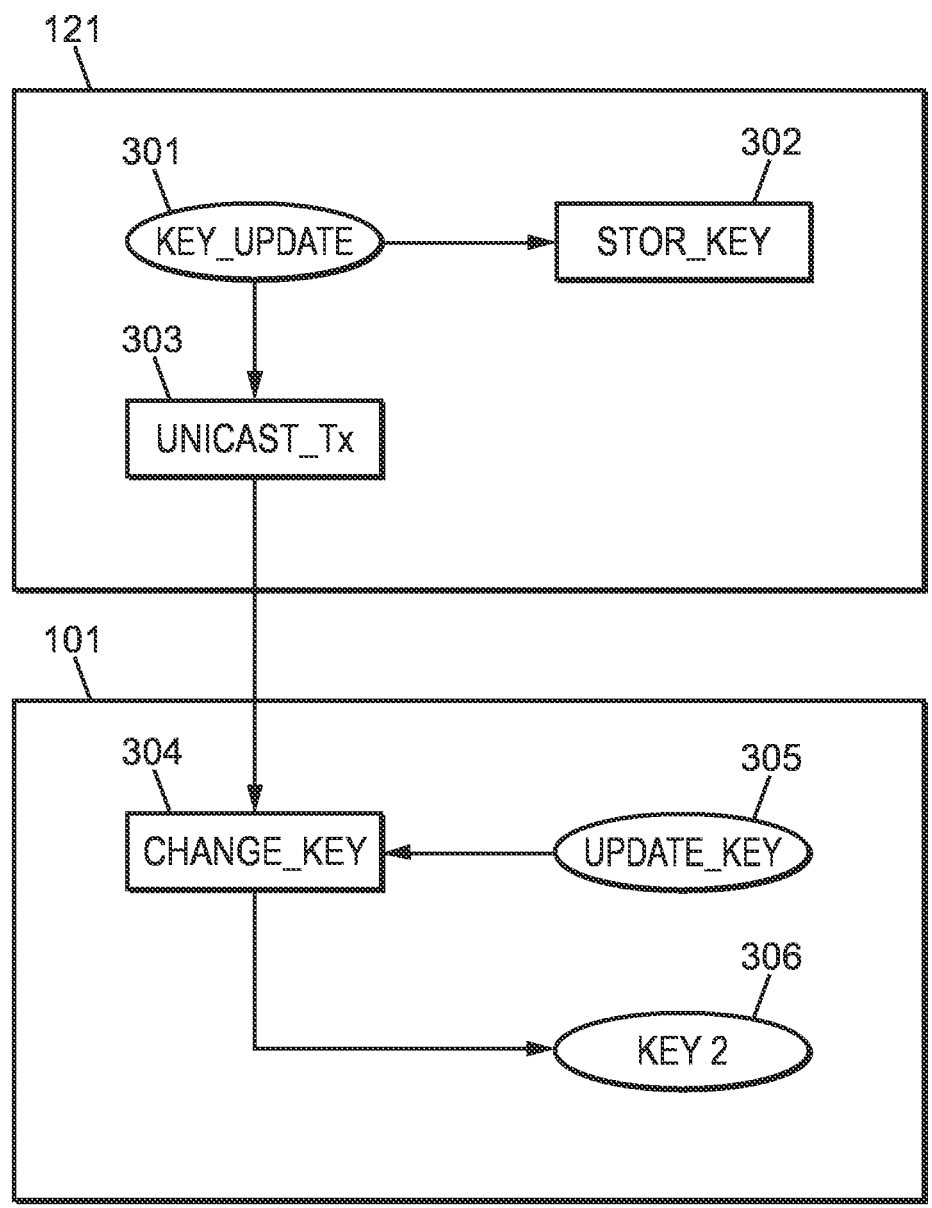
FIG. 3 is a flow chart illustrating the different steps of a cryptographic key update, in a possible embodiment of the present invention.

FIG. 3 is a flow chart illustrating the different steps of a cryptographic key update, in a possible embodiment of the present invention.

In some situations, an update of a cryptographic key, for instance the application key AppKey, of a device may be needed (for example, when the IoT central network controller subsystem has been hacked and the AppKey is compromised).

From key update data 301, the server 121 sends (step 303) a key update command to the end-device 101, through the unicast address of the end-device 101. In parallel, the new key is stored (302) in an encrypted form in the memory of the communication interface of the server 121, in place of the former key (which means that the list of application keys relative to the set of devices connected to the server is updated with the new application key of the end-device 101).

Then, the end-device 101 receives the key update command and the trusted execution part of the end-device proceeds to the change (step 304) of the application key.

The encryption of the new key is done from a dedicated "update key" 305 that has been stored in advance (for example during manufacturing) in the end-device 101 for this purpose. Alternatively, the change can be done by using a specific cryptographic primitive ("update key primitive"), stored in the memory of the communication interface of the end-device 101, from which the trusted execution part may encrypt the new key (306) from the previous key.

Of course, the encryption on the server side can also be performed via an "update key" stored in the memory of communication interface of the server.

Figure 4A:
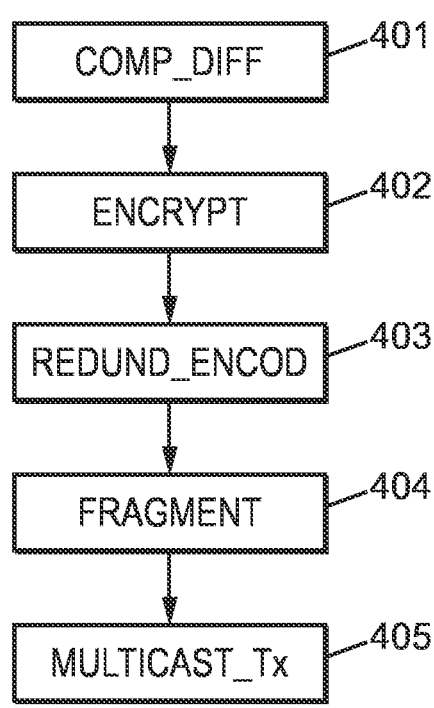
FIG. 4a is a flow chart illustrating the different steps of a cryptographic code upgrade on the server side, in a possible embodiment of the present invention.
Figure 4B:
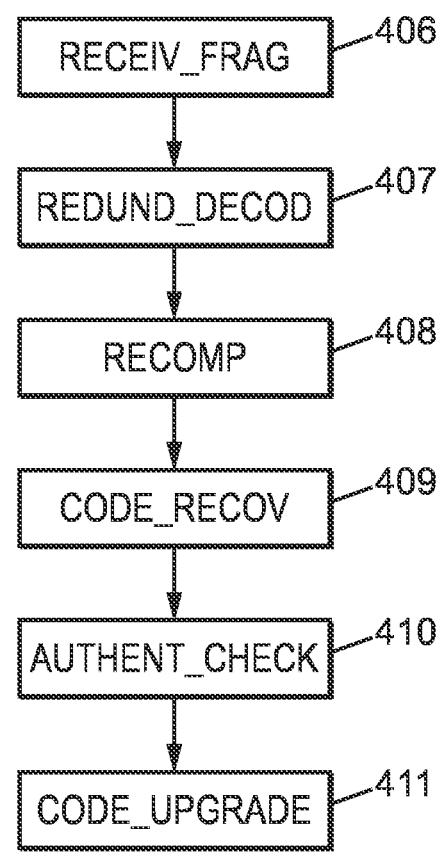
FIG. 4b is a flow chart illustrating the different steps of a cryptographic code upgrade on the device side, in a possible embodiment of the present invention.

FIGS. 4a and 4b are flow charts illustrating the different steps of a cryptographic code upgrade, in a possible embodiment of the present invention.

IoT is a very innovative field, which means evolutions of the protocols may be added over time, as well as enhancements and corrections to the security features of the protocols.

An example of a security upgrade relates to the cryptographic algorithms that are stored in the reprogrammable section of the memory of a piece of equipment (end-device or server). While such upgrade is a classical application in the traditional context of microcontrollers, it is not straightforward in the context of IoT networks, where communication primitives are limited to very small payload size (typically 50 bytes in the case of LoRaWAN), and subject to duty cycle limitation (typically 1% airtime, shared in downlink between all devices in a given RF cell).

As a consequence, for allowing upgradability in the context of IoT communication links, it is required to:
 efficiently convey the upgraded code simultaneously to multiple devices, while minimizing the RF cell airtime; and
 minimize the amount of data sent over the air for a given code change.

The present invention allows such code upgrades, which meet these requirements.

For code and algorithm evolutions, which do not need to be secret, but only authenticated, it is possible to transmit only the changes in the compiled code. Contrarily to the common practice of transmitting the entire re-compiled binary code to the device, only the difference between the upgraded binary code and the original code may be transmitted. This can be done by using compilation discipline where all the sub-functions of a code are linked at pre-defined offsets, so that a change in one functional block does not affect pointers in other blocks. Thus a very small code "patch" is used, which is compatible with the constraints of IoT communication.

Thus, with reference to FIG. 4a which describes a process of a server-side code upgrade, the difference between the complete upgraded code sequence and the complete original code sequence may be computed during a first step 401. The output of this step is then a code upgrade command including a set of sequences of code comprising only the code parts which have to be upgraded.

In step 402, the code upgrade command may be encrypted by the trusted execution part of the server. For the encryption, it is possible to use a multicast key (or group key): when a wireless device sends a command for joining a multicast group of wireless devices, a cryptographic "group key", specific to the multicast group of wireless devices, is sent to the device. This cryptographic group key may be encrypted by the trusted execution part with the root secret of the microprocessor and stored in the reprogrammable section of the memory. Each device of the group of wireless devices, as well as the network server, has the encrypted group key stored in the reprogrammable memory section of its communication interface. The group key may be used directly, or indirectly by means of key derivation, e.g. deriving a multicast packet payload decrypt key based on hash of group key and LoRaWAN uplink packet counter of decoded packet.

As each device of the multicast group may experience random packet loss for different reasons, redundant information can be optionally added at step 403. Thus, a receiving device may compensate for a large loss of information. In a specific embodiment, this can be achieved by using Low-Density Parity Check (LDPC) codes, which are well adapted for applications requiring reliable and efficient information transfer. Forward error correction using LDPC codes is well known in the art. See, e.g. Gallager, R. G., "Low Density Parity Check Codes, Monograph, M.I.T. Press, 1963.

The code upgrade command can then be split into a plurality of fragments during a step 404, so that each fragment can be transmitted (step 405) in a message to the multicast address of the group of devices which need to be upgraded.

Referring now to FIG. 4b, the encrypted fragments are then received (step 406) by an end-device of the group of devices, and decrypted by the trusted execution part of the device with the cryptographic group key. Then, a redundancy decoding, corresponding to the algorithm chosen for the redundancy encoding on the server side, can be optionally applied to the plurality of fragments (step 407). The fragments are then reassembled (step 408) in order to obtain the upgraded code portion that has to be changed in the computer code stored in the memory of the end-device. Then, the code portion to upgrade may be replaced by the corresponding upgraded code portion, and the complete upgraded code sequence may be recovered (step 409).

In order to check authenticity (step 410) of the data received, the device may use, after collecting and reconstructing the upgrade code, its own cryptographic application key (AppKey) to compute a first hash of the patch received (for instance, a SHA256 hash). Then, the hash code is sent to a verification server comprising a communication interface according to the present invention. The verification server can be the network server or a separate secure server.

The trusted execution part of the verification server then computes a second hash from the AppKey of the device concerned (this AppKey being stored in the memory of the server, like all the application keys of the devices connected to the server). Finally, the verification server checks whether the hash code corresponds to the data which have to be transmitted to the device by comparing the two hashes. If the two hashes are equal, the verification server sends a message to the end-device to validate that the computer code can be changed, and the upgraded code is stored in the memory of the device (step 411).

One advantage of using the individual cryptographic application key of the end-device rather than the group key is to increase the security level. Indeed, if the key group is compromised, using the individual AppKey for authenticating the data received avoids introducing malicious or compromised code in all devices of the group.

The proposed communication interface, and its use in a device or in a server, provides greater effectiveness in terms of cost and space over existing IoT state of the art by eliminating the need for a specific secure element (SE) chip. It may also address the obsolescence issue associated with SE chips by providing the technical means of upgrading both cryptographic root keys and code of an IoT security subsystem, in the context of severe communication link constraints (very limited amount of data).

In the network, it allows a high level of security of LPWANs by eliminating any exposure of secret material over unsecure communication link or memory. Access to sensitive cryptographic keys of the devices becomes physically impossible. Therefore the need to have specific protection of computer systems, or trusted third parties, is reduced.

Of course, the present invention is not limited to the embodiments described above as examples. It extends to other variants.

For example, even if some of the embodiments have been presented in the context of LoRa communication protocols, the present invention is not limited to this these. It can be used in any LPWAN including cryptographic primitives, or versions of the LoraWAN other than 1.0.

Moreover, even if the "Over-The-Air Activation" method has been described here, the present invention is not limited to this type of activation. For instance, in the context of a LoRaWAN, the present invention can be used in the case where the end-devices are Activated By Personalization (APB), in which the DevAddr and the two session keys NwkSKey and AppSKey are directly stored into the end-device instead of the DevEUI, AppEUI and the AppKey.

Also, even if the invention has been presented for some activation or upgrade methods, it can be used in other situations. For instance, the export of keys, which can be required for example by national security forces, can be performed by a communication interface as disclosed in the present document. It can be implemented by specific custom primitives running in secure mode, for example requiring simultaneous presentation of several secrets so that access to keys becomes possible only in presence of a notary or similar trusted entity.

The invention claimed is:

1. A communication interface for supporting communication between a wireless device and a server over a low power wide area network, LPWAN, wherein the communication interface comprises:

an untrusted execution part configured to operate in accordance with an LPWAN communication protocol stack including at least one secured LPWAN protocol using cryptographic primitives;

a memory for storing computer code and at least one cryptographic key in an encrypted form;

a trusted execution part incorporating a root secret for decrypting the at least one cryptographic key from the memory, wherein the trusted execution part is configured to execute the cryptographic primitives of the at least one secured LPWAN protocol using the decrypted cryptographic key and computer code from the memory.

2. The communication interface as claimed in claim 1, comprising a microcontroller chip which includes both the untrusted execution part and the trusted execution part.

3. The communication interface as claimed in claim 1, wherein the memory has a reprogrammable memory section for storing computer code and a cryptographic application key in an encrypted form, and a RAM or flash section for storing, in an encrypted form, at least one cryptographic session key computed by the trusted execution part as a function of the cryptographic application key.

4. The communication interface as claimed in claim 3, wherein the reprogrammable memory section is further provided for storing a cryptographic group key written in an encrypted form by the trusted execution part in response to a command for joining a multicast group of wireless devices.

5. The communication interface as claimed in claim 1, wherein execution of one of the cryptographic primitives by the trusted execution part comprises encrypting concatenated information elements of a first set of information elements with an application key decrypted from the memory to derive a first session key, wherein the first set of information elements includes at least one nonce.

6. The communication interface as claimed in claim 5, wherein the concatenated information elements of the first set include a first nonce generated by the server, an identifier of the LPWAN and a second nonce generated by the wireless device.

7. The communication interface as claimed in claim 5, wherein the trusted execution part is configured to encrypt the first session key with the root secret and write the encrypted first session key in a RAM or flash section of the memory.

8. The communication interface as claimed in claim 5, wherein execution of one of the cryptographic primitives by the trusted execution part comprises encrypting a message provided by the untrusted execution part using the first session key.

9. The communication interface as claimed in claim 5, wherein execution of one of the cryptographic primitives by the trusted execution part comprises encrypting concatenated information elements of a second set of information elements with the application key decrypted from the memory to derive a second session key, wherein the second set of information elements includes at least one nonce.

10. The communication interface as claimed in claim 9, wherein the concatenated information elements of the second set include a first nonce generated by the wireless device, an identifier of the LPWAN and a second nonce generated by the server.

11. The communication interface as claimed in claim 9, wherein the trusted execution part is configured to encrypt the second session key with the root secret and write the encrypted second session key in a RAM or flash section of the memory.

12. The communication interface as claimed in claim 9, wherein execution of one of the cryptographic primitives by the trusted execution part comprises computing a message integrity check, MIC, value based on an encrypted message using the second session key.

13. The communication interface as claimed in claim 1, wherein execution of one of the cryptographic primitives by the trusted execution part comprises computing a message integrity check, MIC, value based on concatenated elements, including a nonce generated by the wireless device, an identifier of the device, and an identifier of an application provider, using an application key decrypted from the memory.

14. The communication interface as claimed in claim 1, wherein execution of one of the cryptographic primitives by the trusted execution part comprises computing a message integrity check, MIC, value based on concatenated elements, including an identifier of the LPWAN and an address of the wireless device, using an application key decrypted from the memory.

15. A wireless device having a communication interface for communicating with a server over a low power wide area network, LPWAN, wherein the communication interface is as claimed in claim 1.

16. The wireless device as claimed in claim 15, wherein the trusted execution part of the communication interface is configured to change at least one cryptographic key stored in an encrypted form in the memory of the communication interface in response to a key update command received over the LPWAN.

17. The wireless device as claimed in claim 16, wherein the change of the at least one cryptographic key is performed by the trusted execution part using an update key stored in an encrypted form.

18. The wireless device as claimed in claim 15, wherein the trusted execution part of the communication interface is configured to change a portion of the computer code stored in the memory in response to a code upgrade command received over the LPWAN.

19. The wireless device as claimed in claim 18, wherein the code upgrade command is received on a multicast address of the LPWAN in at least one encrypted message which is decrypted by the trusted execution part using a cryptographic group key stored in an encrypted form in the memory.

20. The wireless device as claimed in claim 19, wherein the communication interface is configured to apply redundancy decoding to the at least one encrypted message to obtain an upgraded code portion for changing the portion of the computer code stored in the memory.

21. The wireless device as claimed in claim 20, wherein the redundancy decoding comprises a low-density parity check, LDPC, decoding.

22. The wireless device as claimed in claim 18, wherein the trusted execution part is configured to compute a hash code based on a cryptographic key stored in an encrypted form in the memory and an upgraded code portion received as part of the code upgrade command, and
wherein the communication interface is configured to transmit the hash code to a verification server and to receive a response from the verification server to validate whether the portion of the computer code is to be changed.

23. A server having a communication interface for communicating with a plurality of wireless devices over a low power wide area network, LPWAN, wherein the communication interface comprises:
an untrusted execution part configured to operate in accordance with an LPWAN communication protocol stack including at least one secured LPWAN protocol using cryptographic primitives;
a memory for storing computer code and at least one cryptographic key in an encrypted form;
a trusted execution part incorporating a root secret for decrypting the at least one cryptographic key from the memory,
wherein the trusted execution part is configured to execute the cryptographic primitives of the at least one secured LPWAN protocol using the decrypted cryptographic key and computer code from the memory.

24. The server as claimed in claim 23, wherein the memory of the communication interface stores a plurality of cryptographic application keys in an encrypted form, each cryptographic application key being for a respective wireless device of the LPWAN.

25. The server as claimed in claim 24, herein for changing the cryptographic application key for one of the plurality of wireless devices, the communication interface is configured to transmit a key update command to the one of the wireless devices over the LPWAN, through a unicast address of the one of the plurality of wireless devices, and the trusted execution part of the communication interface is configured to change the cryptographic key stored in an encrypted form in the memory of the communication interface for the one of the plurality of wireless devices.

26. The server as claimed in claim 23, wherein for changing a computer code portion used by a group of wireless devices, the communication interface is configured to transmit a code upgrade command over the LPWAN, through a multicast address of the LPWAN.

27. The server as claimed in claim 26, wherein the trusted execution part of the communication interface is configured to encrypt the code upgrade command with a cryptographic group key associated with the multicast address of the LPWAN prior to transmission through the multicast address.

28. The server as claimed in claim 27, wherein the encrypted code upgrade command is redundancy encoded and then split into a plurality of fragments transmitted in respective messages to the multicast address of the LPWAN.

29. The server as claimed in claim 28, wherein the encrypted code upgrade command is redundancy encoded using low-density parity check, LDPC, encoding.

30. The server as claimed in claim 26, wherein the communication interface is configured to receive a first hash code from one of the group of wireless devices,
wherein the trusted execution part is configured to compute a second hash code based on a cryptographic key stored in an encrypted form in the memory for the one of the group of wireless devices and an upgraded code portion to be substituted for the computer code portion used by the group of wireless devices, and
wherein the communication interface is further configured to compare the first and second hash codes and to send a response to the one of the group of wireless devices depending on whether or not the first and second hash codes are identical.

* * * * *